(12) United States Patent
Furman et al.

(10) Patent No.: US 7,513,330 B2
(45) Date of Patent: Apr. 7, 2009

(54) GOLF CAR REAR SUSPENSION HEIGHT ADJUSTMENT

(75) Inventors: Christopher K. Furman, Augusta, GA (US); James Agerton, II, Augusta, GA (US)

(73) Assignee: Textron Inc., Providence, RI (US)

( * ) Notice: Subject to any disclaimer, the term of this patent is extended or adjusted under 35 U.S.C. 154(b) by 512 days.

(21) Appl. No.: 11/419,396

(22) Filed: May 19, 2006

(65) Prior Publication Data

US 2007/0267826 A1    Nov. 22, 2007

(51) Int. Cl.
*B60G 9/02* (2006.01)

(52) U.S. Cl. ................. 180/378; 280/6.157; 280/124.1; 280/124.156; 280/124.179

(58) Field of Classification Search .......... 280/124.179, 280/6.157, 6.15, 43, 124.1, 86.75, 124.156, 280/124.101, 124.162, 124.102; 180/378
See application file for complete search history.

(56) References Cited

U.S. PATENT DOCUMENTS

| | | | |
|---|---|---|---|
| 4,821,827 A | 4/1989 | Reese | |
| 5,275,429 A * | 1/1994 | Bunker | ................ 280/124.177 |
| 5,915,495 A | 6/1999 | Kerlin et al. | |
| 2005/0212244 A1 | 9/2005 | Bobbitt et al. | |
| 2006/0001223 A1 * | 1/2006 | Krieger | ..................... 280/6.15 |
| 2007/0187919 A1 * | 8/2007 | Furman | ............... 280/124.175 |

* cited by examiner

*Primary Examiner*—Ruth Ilan
(74) *Attorney, Agent, or Firm*—Harness, Dickey & Pierce, P.L.C.

(57) ABSTRACT

A height adjustable golf car suspension system includes an axle housing and first and second brackets connected to the axle housing. The first and second brackets each include a first U-shaped member welded to the axle housing, a second U-shaped member welded to the first U-shaped member, and a flange of the second U-shaped member having first and second apertures created through the flange. The first and second apertures receive a mounting fastener of a shock absorber and coil spring assembly. The first aperture is positioned above the second aperture. A height of the suspension system is adjustable by insertion of the mounting fastener into a select one of the first and second apertures of both the first and second brackets.

28 Claims, 6 Drawing Sheets

GOLF CAR REAR SUSPENSION HEIGHT ADJUSTMENT

FIELD

The present disclosure relates to a device and method for connecting and adjusting suspension elements for golf car and off-road utility vehicles.

BACKGROUND

The statements in this section merely provide background information related to the present disclosure and may not constitute prior art.

Golf cars and many off-road or utility vehicles, hereinafter "golf cars" commonly have rigid or single axle suspension systems for both the front steerable wheels and the rear driving wheels. Rear suspensions for these vehicles commonly include leaf springs and/or shock absorber assemblies used to support the solid axle. Some golf car designs have also used coil springs in combination with shock absorbers, eliminating the need for leaf springs to both stabilize the vehicle and to provide a more comfortable ride. Shock absorbers dampen the coil spring travel and frequency which therefore promote a more stable and comfortable ride feel.

Connection of the various coil spring/shock absorber and suspension system components to the frame generally only permits the suspension system to provide for a single vehicle platform. It is often desirable, however, to accommodate multiple vehicle tire sizes or multiple vehicle combinations, such as food/beverage service carts, or sporting versions of the carts. Providing for multiple platform designs increases the costs of manufacture of the suspension system due to different assembly requirements, as well as the requirement to develop and stock multiple parts for both construction and for repair/replacement.

SUMMARY

According to several embodiments of the present disclosure, a height adjustment connector for a golf car suspension system includes a bracket connected to a portion of the suspension system. The bracket includes a first substantially U-shaped member connected to the portion of the suspension system. A second substantially U-shaped member is connected to the first U-shaped member. A flange of the second U-shaped member has first and second apertures created through the flange adaptable for receiving a mounting fastener of a shock absorber assembly. The first aperture is positioned above the second aperture. A height of the suspension system being adjustable by insertion of the mounting fastener into of one of the first and second apertures.

According to several embodiments, a height adjustable golf car suspension system includes a axle housing and first and second brackets connected to the axle housing. The first and second brackets each include a first U-shaped member welded to the axle housing, a second U-shaped member welded to the first U-shaped member, and a flange of the second U-shaped member having first and second apertures created through the flange. The first and second apertures receive a mounting fastener of a shock absorber assembly. The first aperture is positioned above the second aperture. A height of the suspension system is adjustable by insertion of the mounting fastener into a select one of the first and second apertures of both the first and second brackets.

According to still other embodiments, a golf car includes a frame and a suspension system connected to the frame. The suspension system has an axle disposed in an axle housing. At least one bracket is connected to the axle housing. The bracket includes a first substantially U-shaped member welded to the axle housing, and a second substantially U-shaped member welded to the first U-shaped member defining a cavity between the first and second U-shaped members. A flange of the second U-shaped member has first and second apertures created through the flange. A coil and shock absorber assembly has a connection sleeve disposed in the cavity which is connected to the flange using a mounting fastener disposed through one of the first and second apertures to define one of a first and second suspension system height.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
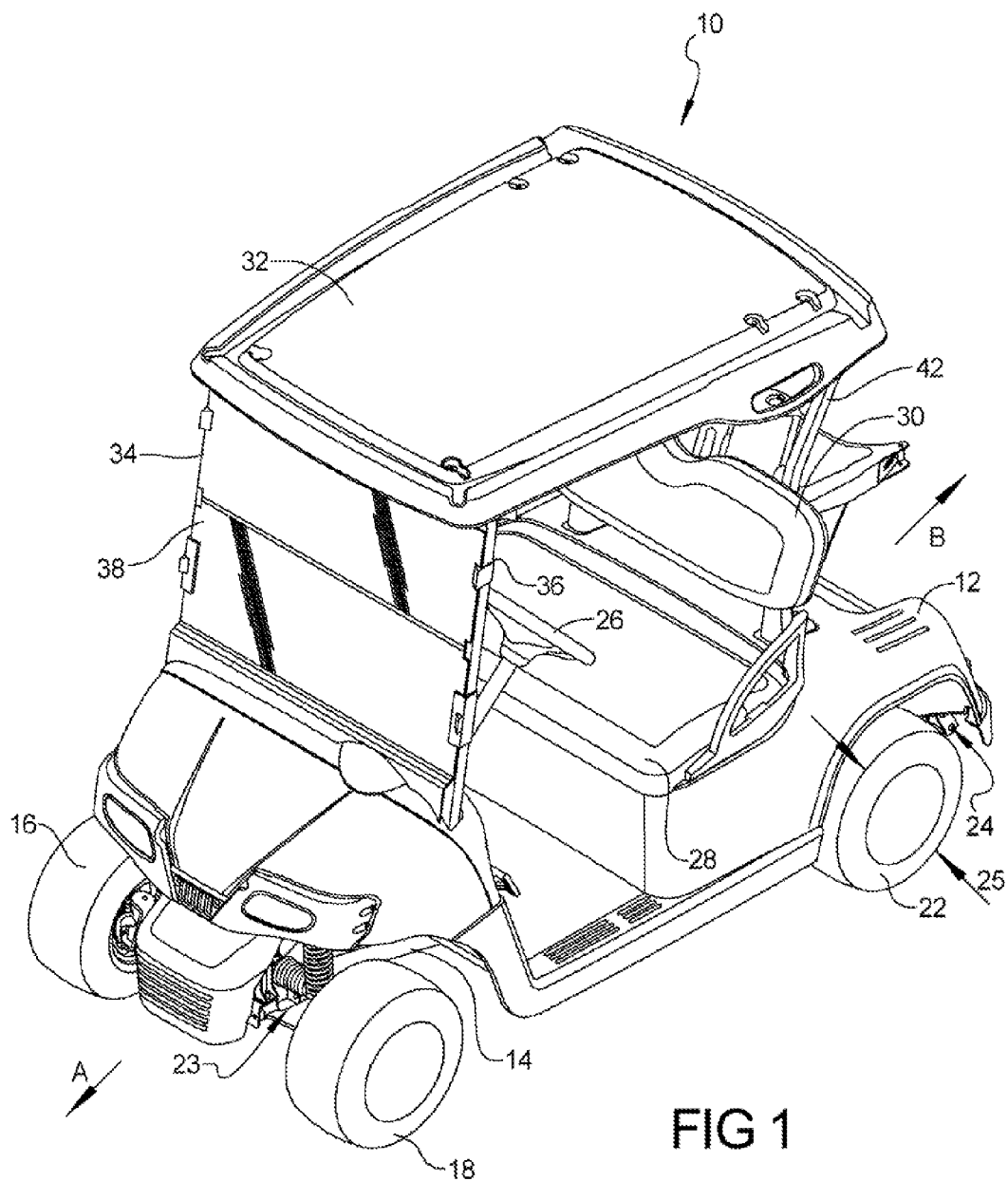
FIG. 1 is a perspective view of a golf car having the combination spring, shock and brake cable brackets according to various embodiments.

The following description is merely exemplary in nature and is in no way intended to limit the present disclosure, application, or uses. Throughout this specification, like reference numerals will be used to refer to like elements. As referred to herein, the term "golf car" is synonymously used to describe application of the present disclosure to golf cars as well as sport utility vehicles such as modified golf cars, used for example as food and/or beverage cars, golf cars adapted for use as hunting/sporting clays vehicles, golf course maintenance vehicles, and the like.

Referring generally to FIG. 1, a golf car 10 can include a body 12 supported from a structural frame 14. Frame 14 can also support a plurality of wheels including a first steerable wheel 16 and a second steerable wheel 18. In addition, powered or driven wheels including a first driven wheel 20 and a second driven wheel 22 are commonly connected to a rear structural portion of frame 14. A front suspension system 23 can also be provided which is adapted for supporting each of the first and second steerable wheels 16, 18. A rear suspension system 24 can also be provided which is adapted for supporting each of the first and second driven wheels 20, 22. At least first and second driven wheels 20, 22 have a diameter 25, which is distinguishable as a first diameter 25' and a second diameter 25", the second diameter 25" greater than the first diameter 25'. A steering mechanism 26 which commonly includes a steering wheel and a support post assembly is also included to provide the necessary steering input to first and second steerable wheels 16, 18.

Golf car 10 can also include a passenger bench seat 28 and a passenger back support cushion 30. A cover or roof 32 can also be provided which is supported from either body 12 or frame 14 by first and second support members 34, 36. A windscreen or windshield 38 can also provided which is also supported by each of first and second support members 34, 36. A rear section of roof 32 can be supported by each of a first and a second rear support element 40, 42. Other items provided with golf car 10 include golf bag support equipment, accessory racks or bins, headlights, side rails, fenders, and the like.

Golf car 10 is commonly propelled by a power unit such as an engine or battery/motor system which is commonly provided below and/or behind bench seat 28. Golf car 10 is capable of motion in either of a forward direction "A" or a rearward direction "B". Each of first and second driven wheels 20, 22 can be commonly supported to frame 14 using rear suspension system 24. Each of first and second steerable wheels 16, 18 can be independently or commonly supported to frame 14, therefore the present disclosure is not limited by the design of front suspension system 23.

Figure 2:
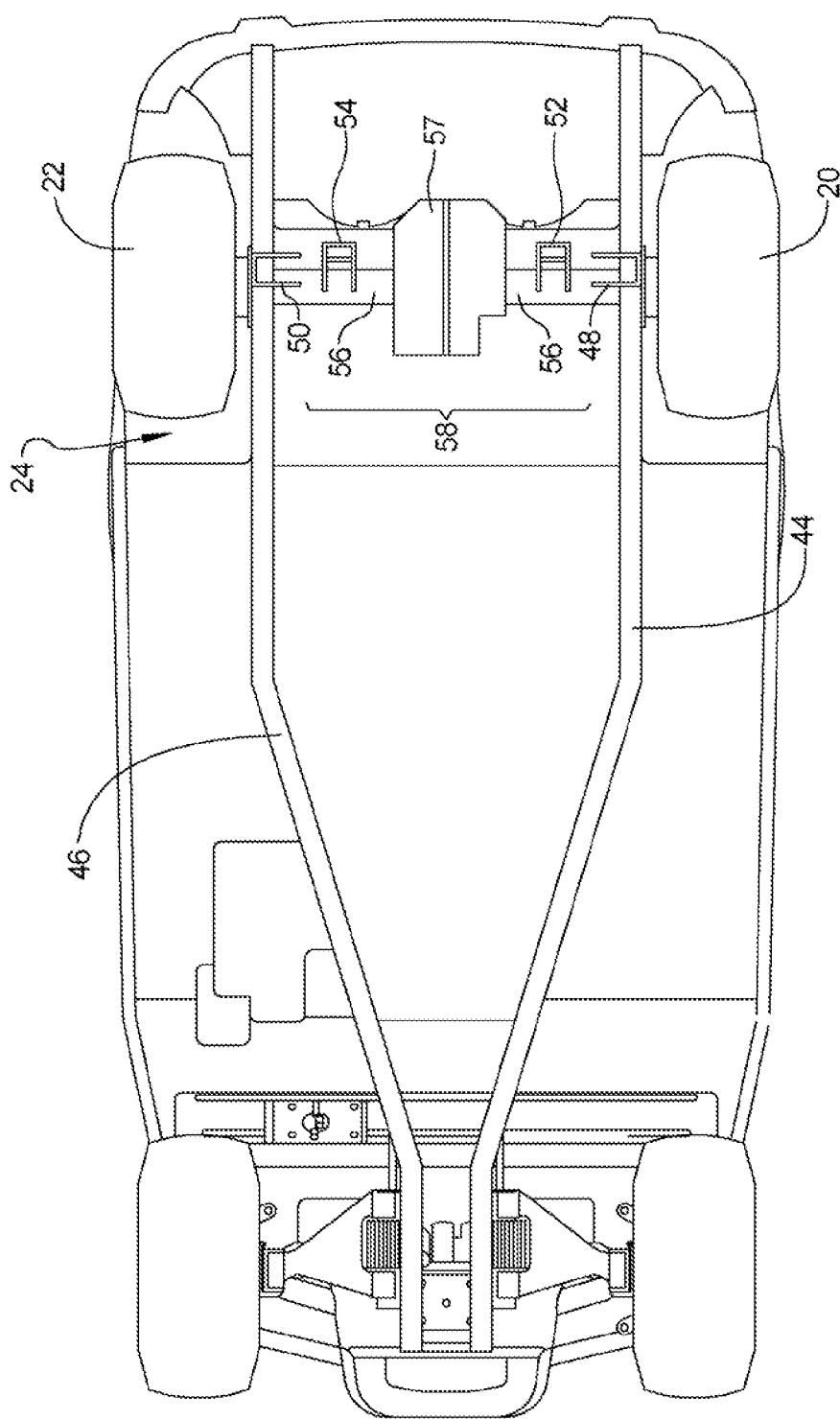
FIG. 2 is a bottom plan view of the golf car of FIG. 1.

As best seen in reference to FIG. 2, frame 14 can further include a longitudinally arranged first frame member 44 and a second frame member 46. First and second frame members 44, 46 can be hollow, tubular shaped members created of a steel material or similar structural material and formed by welding, extruding, hydroforming, or similar processes. A first and second frame connection member 48, 50 receive distal ends of combined shock absorber/coiled spring assemblies to support each of first and second driven wheels 20, 22. A first shock support assembly 52 provides installation height adjustment for rear suspension system 24. Similarly, a second shock support assembly 54 also provides installation height adjustment for rear suspension system 24. Each of first and second shock support assemblies 52, 54 are connected to an axle housing 56 within which an axle (shown in FIG. 3) is rotatably disposed for providing driving power to the first and second driven wheels 20, 22 through a gear train or axle gear housing 57 connected to the power unit. Axle housing 56 and axle gear housing 57 in part create a rear drive assembly 58.

Figure 3:
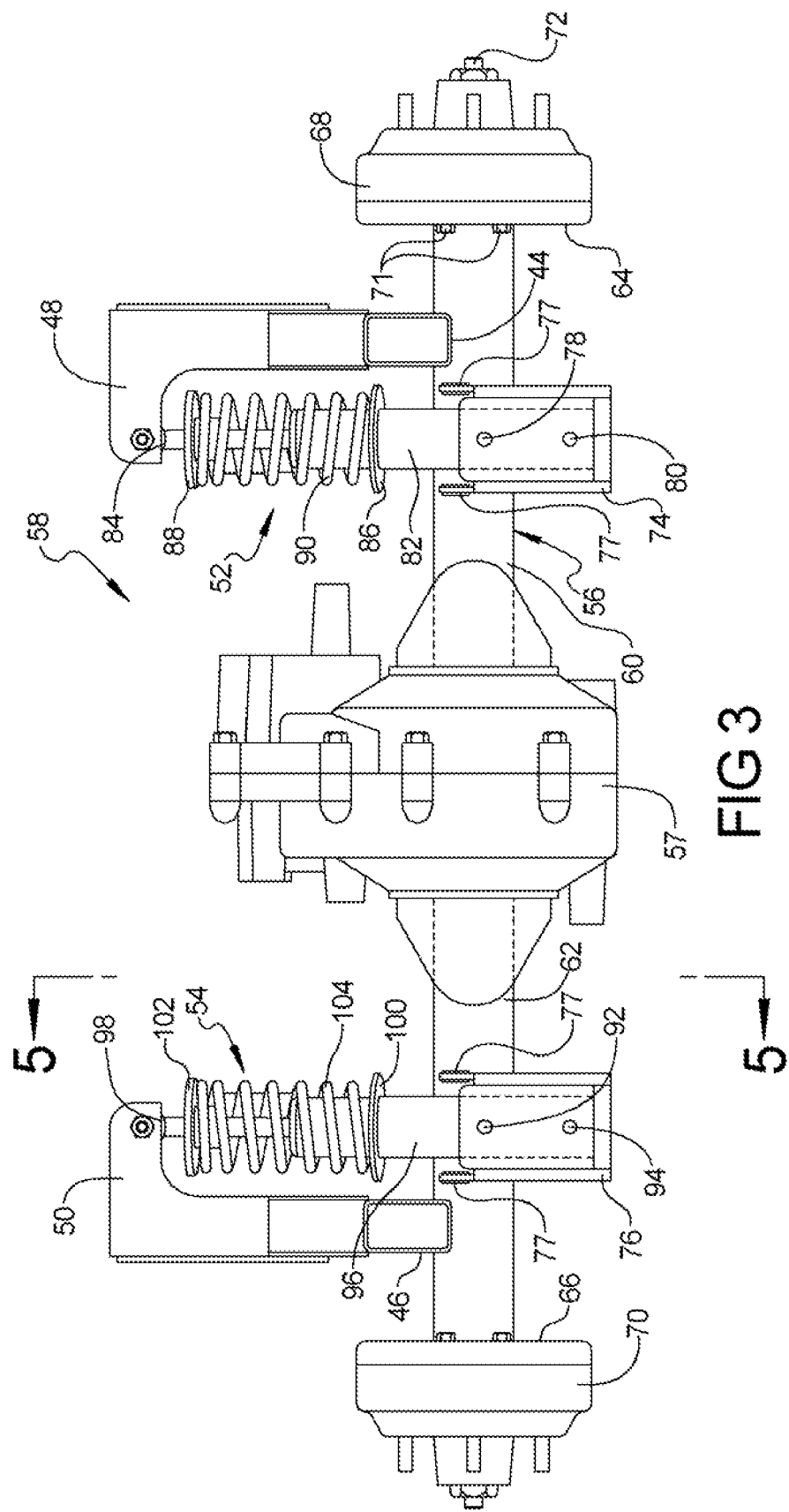
FIG. 3 is a rear elevation view looking forward of a rear drive assembly having the rear coil spring height adjustment device of the present disclosure.

Referring now to FIG. 3, multiple components of the rear drive assembly 58 include axle gear housing 57 which divides axle housing 56 into each of a first housing portion 60 and a second housing portion 62. At a distal end of first housing portion 60 a first wheel mounting plate 64 is connected such as by welding. At a distal end of second housing portion 62 a second wheel mounting plate 66 is similarly provided. First and second wheel mounting plates 64, 66 each have one of a first or second wheel hub/brake drum 68, 70 connected to the mounting plate, for example using a plurality of fasteners 71. An axle 72 is rotatably disposed throughout axle housing 56 which is rotated by axle gear housing 57 to provide the rotating drive for first and second driven wheels 20, 22.

According to several embodiments, a first shock mount bracket 74 is connected to first housing portion 60 and a second shock mount bracket 76 is connected to second housing portion 62. Each of the shock mount brackets 74, 76 are fixed in place, for example using a plurality of weld joints 77. First and second shock mount brackets 74, 76 provide multiple height positions for mounting shock absorbers, which permit multiple height positions for axle housing 56, and therefore allow for different sizes of first and second driven wheels 20, 22.

First shock mount bracket 74 provides a first height adjustment aperture 78 and a second height adjustment aperture 80. A first shock absorber 82 including a coil spring assembly is connected to first shock mount bracket 74 at either one of first or second height adjustment apertures 78 or 80. First shock absorber 82 includes a first connection sleeve 84 which is connectable to frame 14. First shock absorber 82 further includes a biasing element fixed support plate 86 and a biasing element adjustable support plate 88 between which a biasing element 90 is disposed. Adjusting the position of biasing element adjustable support plate 88 allows the amount of compression provided by biasing element 90 to be controlled thereby adjusting the ride comfort and total weight carrying capacity of golf car 10.

Similar to first shock mount bracket 74 second shock mount bracket 76 includes a first height adjustment aperture 92 and a second height adjustment aperture 94. A second shock absorber 96 including a coil spring assembly is connected to second shock mount bracket 76 at either of first or second height adjustment apertures 92 or 94. Second shock absorber 96 similar to first shock absorber 82 includes a biasing element fixed support plate 100, a biasing element adjustable support plate 102, and a biasing element 104 which each function similar to the corresponding elements of first shock absorber 82. First and second shock support assemblies 52, 54 are therefore substantially identical to each other in several embodiments of the present disclosure. The present disclosure is not limited to identical installations of first and second shock support assemblies 52, 54, as the center of gravity of axle gear housing 57 positioned on axle housing 56 can vary and therefore the load and size of first and second shock support assemblies 52, 54 can be varied.

Figure 4:
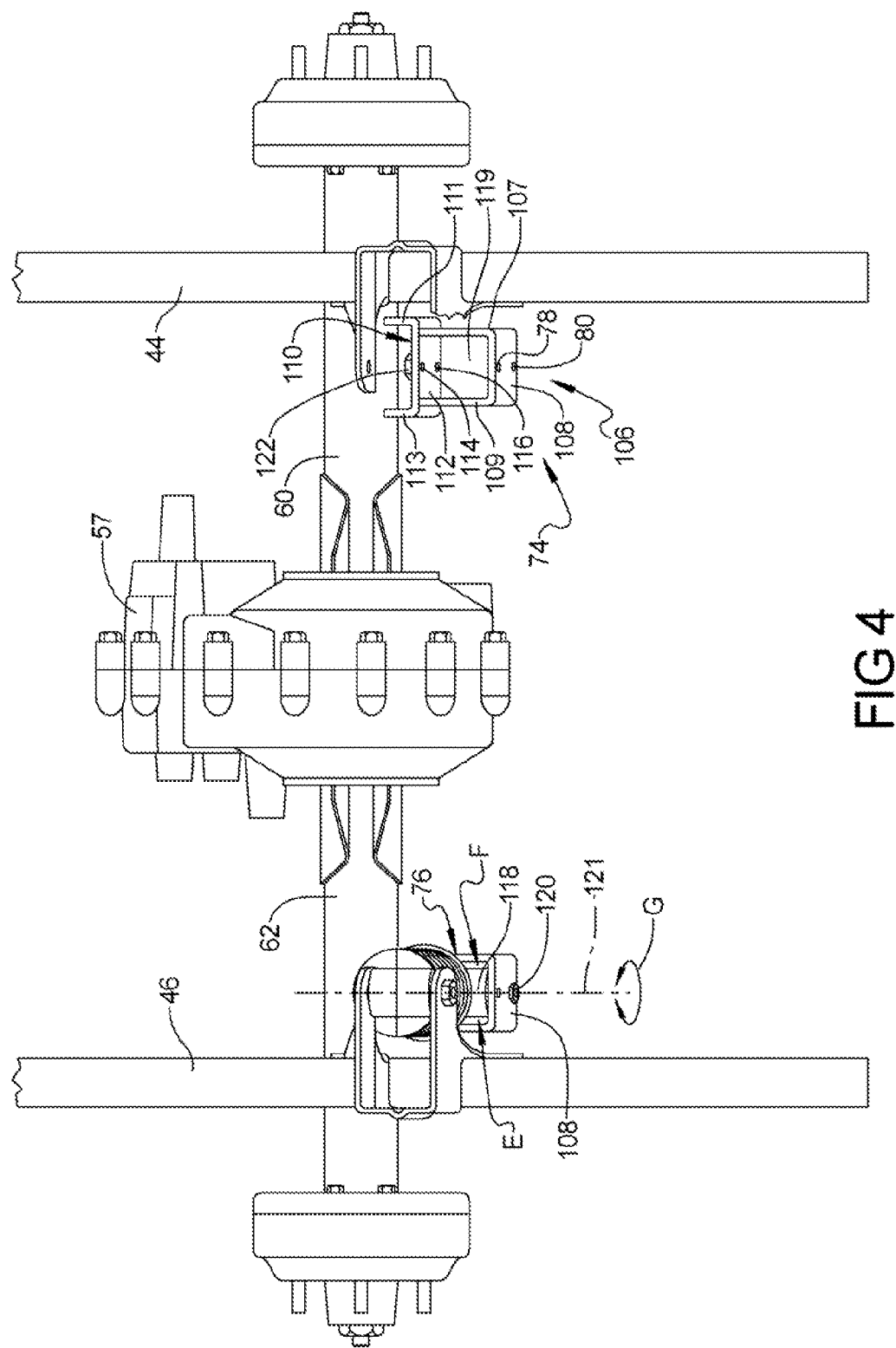
FIG. 4 is a top plan view of the rear drive assembly of FIG. 3.

As best seen in reference to FIG. 4, first and second shock mount brackets 74, 76 each have common members. These include an outer U-shaped member 106 having a first leg 107 joined for example by a bend or a weld to an outer member flange 108, which is connected by a bend or weld to an opposed second wall 109. Outer member flange 108 provides various ones of first and second height adjustment apertures 78, 80 or first and second height adjustment apertures 92, 94. First and second legs 107, 109 of outer U-shaped member 106 are welded or otherwise fixedly connected to an inner U-shaped member 110. Inner U-shaped member 110 is connected for example by welding to one of the first or second housing portions 60, 62. Each inner U-shaped member 110 includes a third leg 111 connected by a bend or weld to an inner member flange 112, which is connected by a bend or weld to an opposed fourth leg 113. Inner member flange 112 is similar to outer member flange 108. In several embodiments, first and second legs 107, 109 of outer U-shaped member 106 are welded to inner member flange 112. First and second fastener receiving apertures 114, 116 are created through inner member flange 112. Each of first and second fastener receiving apertures 114, 116 are co-axially aligned with corresponding ones of first and second height adjustment apertures 78, 80, 92, or 94.

Each of first and second shock absorbers 82, 96 include a second connection sleeve 118 disposed at an opposite end of the shock absorber from first connection sleeve 84. Second connection sleeve 118 is positioned within a cavity 119 defined by first and second legs 107, 109 and outer member flange 108, and inner member flange 112. An aperture of second connection sleeve 118 receives a bolt 120 passed through outer member flange 108 through second connection sleeve 118 and received by inner member flange 112. A first clearance gap "E" and a second clearance gap "F" are provided between second connection sleeve 118 and the inner walls of first and second legs 107, 109 of the outer U-shaped member 106. First and second clearance gaps "E", "F" provide clearance for rotation of second connection sleeve 118 within cavity 119 in a direction "G" about an axis of rotation 121. A plurality of weld nuts 122 are fixed for example by tack welding to an axle housing 56 facing side of inner U-shaped member 110. Each of the weld nuts 122 is co-axially aligned with one of the first or second height adjustment apertures 78, 80, 92, or 94. In several embodiments, bolts 120 are inserted through second connection sleeve 118 and threaded to a corresponding weld nut 122.

Figure 5:
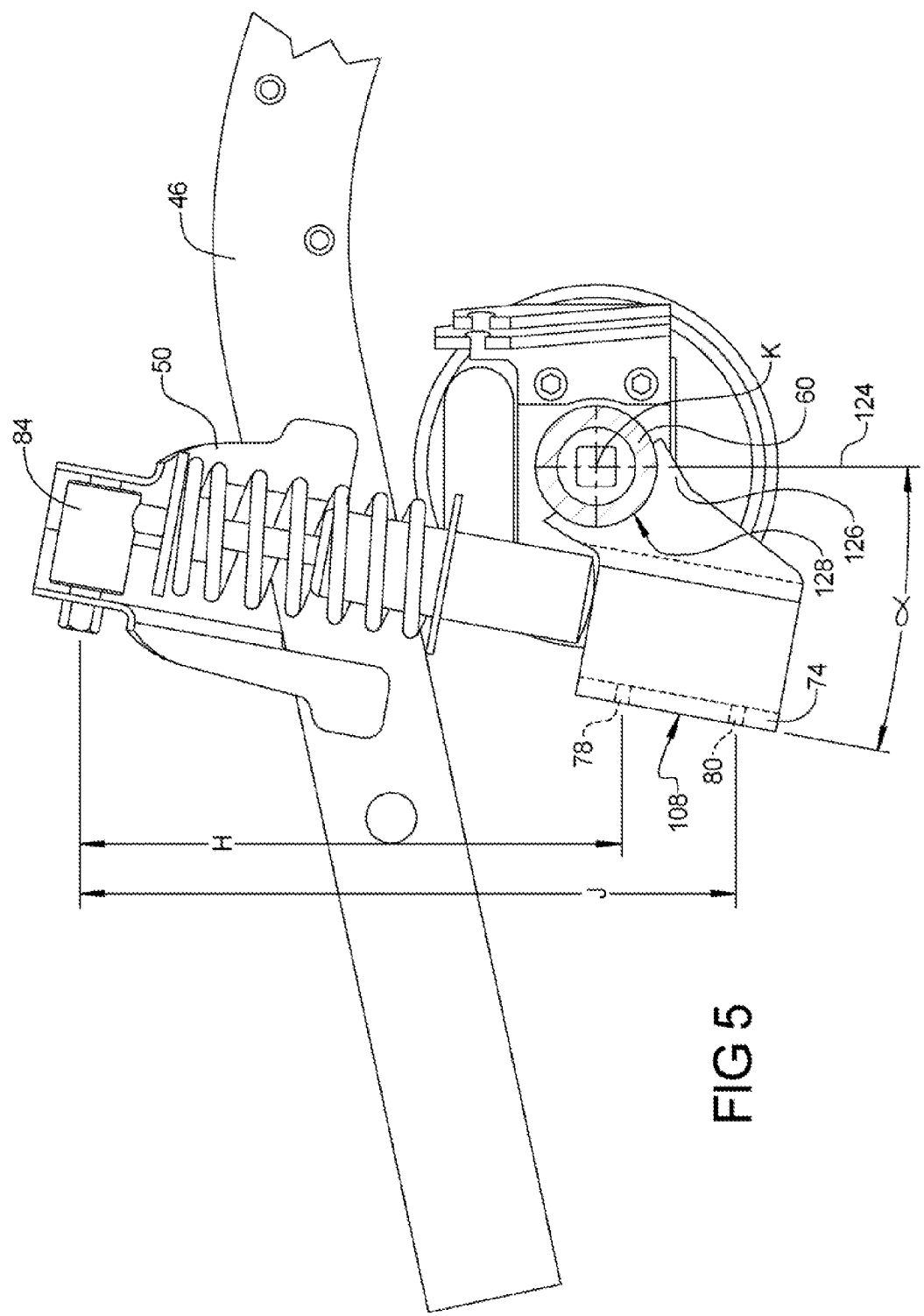
FIG. 5 is cross sectional elevational view taken at section 5-5 of FIG. 3.

Referring now generally to FIG. 5, each outer member flange 108 can be positioned at an angle α with respect to a vertical axis 124 defined through the center of axle housing 56. Angle α matches the orientation of first connection sleeve 84 of first and second shock absorbers 82, 96. Each inner U-shaped member 110 includes a plurality of ears 126 which are shaped to correspond to an outer diameter of first or second housing portion 60, 62. The vertical height "H" is provided between the bolt connection location of first connection sleeve 84 and first height adjustment aperture 78. Similarly, a second vertical height "J" is provided between the bolt connection point of first connection sleeve 84 and second height adjustment aperture 80. The difference between vertical height "H" and second vertical height "J" is predetermined to control an elevation of a longitudinal axis "K" of axle housing 56 to permit height adjustment for rear drive assembly 58 between various platform designs of golf car 10.

Figure 6:
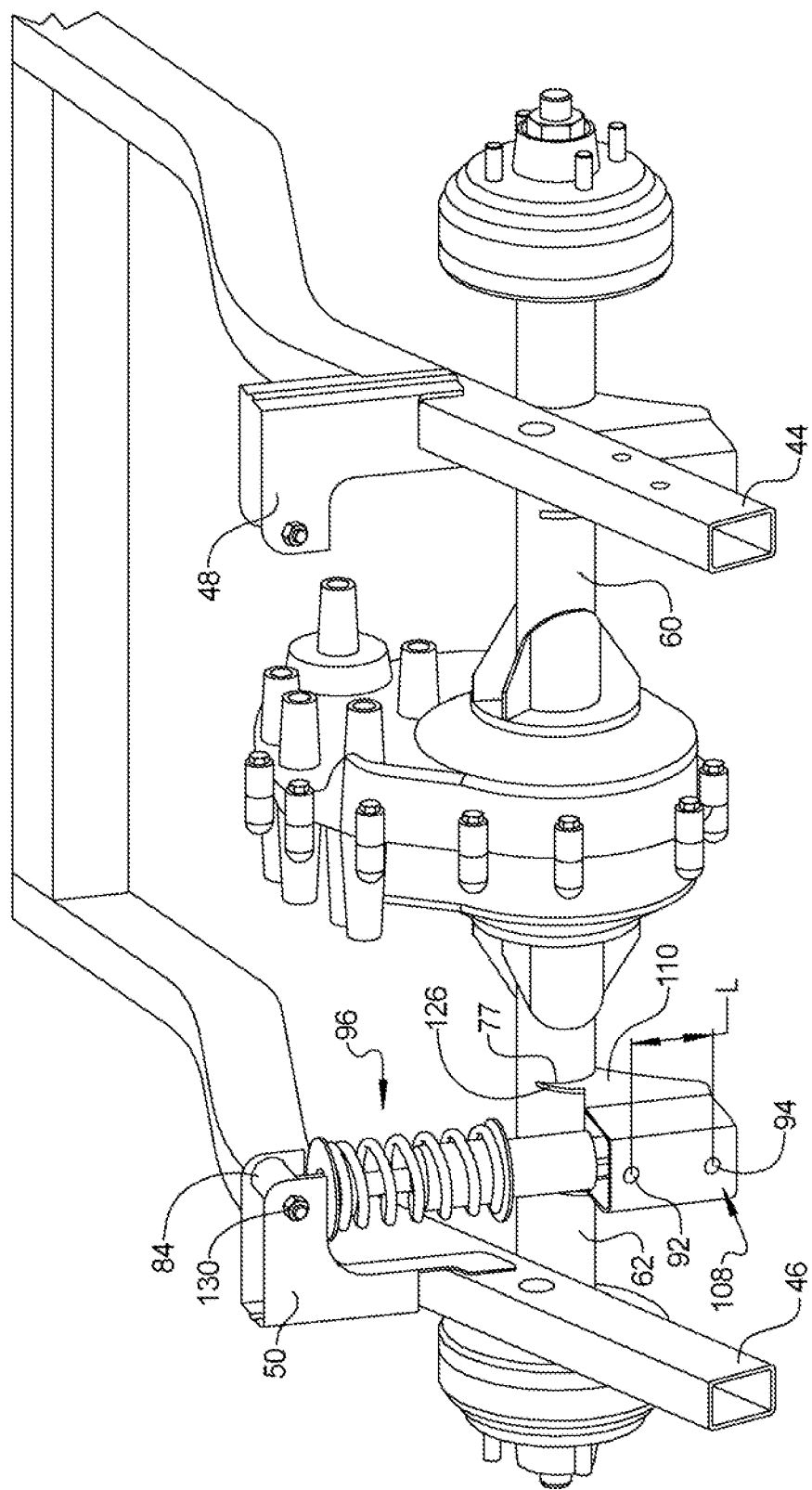
FIG. 6 is a partial rear perspective view of the rear drive assembly of FIG. 3.

Referring now to both FIGS. 5 and 6, the plurality of ears 126 are each shaped to correspond to an outer diameter or outer wall shape of first or second housing portion 60, 62. In several embodiments, a semi-circular arc 128 is created, matching a corresponding circular diameter of first and second housing portions 60, 62. Weld joints 77 are then created to permanently affix each inner U-shaped member 110 to one of the first or second housing portions 60, 62. A spacing "L" between the first and second height adjustment apertures, in this view apertures 92, 94 predetermines the height adjustment range for first and second shock absorbers 82, 96. In several embodiments, spacing "L" is approximately 1.5 in (3.81 cm).

Different platforms of golf car 10 can be provided by attaching first and second driven wheels 20, 22 having first diameter 25' with bolt 120 disposed through one of second height adjustment aperture 80 or 94, or by using second diameter 25" with bolt 120 disposed in one of first height adjustment apertures 78 or 92. Similar wheel diameters can also be used for first and second steerable wheels 16, 18. Wheel diameter differences can be used to distinguish, for example, a standard golf car from a food/beverage service car, or a car used for sporting events such as a sporting clays car. A biasing compression of biasing element 104 can also be adjusted to affect the height "H" or "J" of the suspension assembly, in combination with selection of one of the first or second height adjustment apertures. The biasing element 104 and the shock absorber 82, 96 together limit the travel of the axle housing 56 relative to frame 14, and therefore define a travel limit of the rear suspension system 24.

Rear coil spring height adjustment devices of the present disclosure provide several advantages. By extending the length of a flange to which a shock absorber sleeve is connected to, various adjustable heights are provided for mounting rear drive assemblies to golf cars having different functions. This also permits a variety of diameter wheels to be installed on the golf car to further vary the vehicle designs that a rear drive assembly of the same design can be installed in. Also, by adjusting the height of installation for shock absorbers using rear coil spring height adjustment devices of the present disclosure, the ride feel of the golf car can also be adjusted. By enclosing the lower or second connection sleeve of a shock absorber within a U-shaped member a bolt connecting the connection sleeve to the rear drive assembly of the golf car is captured at both ends of the connection sleeve which can greatly reduce stresses in the bolted joint.

The description herein is merely exemplary in nature and, thus, variations that do not depart from the gist of that which is described are intended to be within the scope of the disclosure. Such variations are not to be regarded as a departure from the spirit and scope of the disclosure.

What is claimed is:

1. A height adjustment connector for a golf car suspension system, comprising:
 a bracket connected to a portion of the suspension system, the bracket including:
  a first substantially U-shaped member connected to the portion of the suspension system;
  a second substantially U-shaped member connected to the first U-shaped member;
  a flange of the second U-shaped member having first and second apertures created through the flange adaptable for receiving a mounting fastener of a shock absorber assembly, the first aperture positioned above the second aperture; and
 a height of the suspension system being adjustable by insertion of the mounting fastener into of one of the first and second apertures.

2. The connector of claim 1, wherein the first member further comprises:
 a second flange; and
 opposed first and second walls extending substantially transverse to the second flange.

3. The connector of claim 2, further comprising a weld joint created at a distal end of each of the first and second walls operable to fixedly connect the first substantially U-shaped member to the portion of the suspension system.

4. The connector of claim 3, wherein the distal end of each of the first and second walls further comprise an ear having a semi-circular arc engageable with the portion of the suspension system.

5. The connector of claim 2, wherein the second member further comprises opposed third and fourth walls extending substantially transverse to the first flange.

6. The connector of claim 5, further comprising a second weld joint created at a distal end of each of the third and fourth walls operable to fixedly connect the third and fourth walls to the second flange.

7. The connector of claim 6, further comprising:
 third and fourth apertures created in the first flange, the third aperture coaxially aligned with the first aperture and the fourth aperture coaxially aligned with the second aperture; and
 a weld nut connected to the first flange coaxially aligned with each of the third and fourth apertures.

8. A height adjustable golf car suspension system, comprising:
 an axle housing;
 first and second brackets connected to the axle housing, the first and second brackets each including:
  a first substantially U-shaped member welded to the axle housing;
  a second substantially U-shaped member welded to the first U-shaped member;
  a flange of the second U-shaped member having first and second apertures created through the flange adaptable for receiving a mounting fastener of a shock absorber assembly, the first aperture positioned above the second aperture; and a height of the suspension system being adjustable by insertion of the mounting fastener into a select one of the first and second apertures of both the first and second brackets.

9. The system of claim 8, wherein the first member further comprises:
a second flange; and
opposed first and second walls extending substantially transverse to the second flange.

10. The system of claim 9, further comprising a weld joint created at a distal end of each of the first and second walls operable to fixedly connect the first substantially U-shaped member to the axle housing.

11. The system of claim 10, wherein the distal end of each of the first and second walls further comprise an ear having a semi-circular arc engageable with the axle housing.

12. The system of claim 9, wherein the second member further comprises opposed third and fourth walls extending substantially transverse to the first flange.

13. The system of claim 12, further comprising a second weld joint created at a distal end of each of the third and fourth walls operable to fixedly connect the third and fourth walls to the second flange.

14. The system of claim 13, further comprising:
third and fourth apertures created in the first flange, the third aperture coaxially aligned with the first aperture and the fourth aperture coaxially aligned with the second aperture; and
a weld nut connected to the first flange coaxially aligned with each of the third and fourth apertures.

15. The system of claim 14, further comprising:
a cavity defined by the third and fourth walls and both the flange and the second flange; and
first and second shock absorbers each having a connection sleeve disposed in the cavity each connecting sleeve connected to both the flange and the second flange using the mounting fastener.

16. A golf car, comprising:
a frame;
a driven wheel suspension system connected to the frame, the driven wheel suspension system having an axle housing;
at least one bracket connected to the axle housing, the bracket including:
a first substantially U-shaped member welded to the axle housing;
a second substantially U-shaped member welded to the first U-shaped member defining a cavity between the first and second U-shaped members; and
a flange of the second U-shaped member having first and second apertures created through the flange; and
a coil and shock absorber assembly having a connection sleeve disposed in the cavity and connected to the flange using a mounting fastener disposed through one of the first and second apertures to define one of a first and second driven wheel suspension system height.

17. The golf car of claim 16, further comprising an axle rotatably disposed in the axle housing.

18. The golf car of claim 17, further comprising first and second driven wheels connected to the axle for co-rotation with the axle.

19. The golf car of claim 18, further comprising an axle gear housing connected to the axle housing and operable to rotate the axle, the axle gear housing, the axle housing, the at least one bracket and the a coil and shock absorber assembly defining a portion of the suspension system.

20. The golf car of claim 18, wherein the first and second driven wheels comprise a diameter further divisible as one of a first diameter, and a second diameter larger than the first diameter.

21. The golf car of claim 16, further comprising a steerable wheel suspension system connected to the frame independently of the driven wheel suspension system.

22. A method for adjusting the height of a golf car suspension system, the golf car having a frame, a suspension system connected to the frame, the suspension system including an axle housing, at least one bracket connected to the axle housing, the bracket including a first and second substantially U-shaped members, the method comprising:
connecting the first U-shaped member to the axle housing;
fixing the second U-shaped member to the first U-shaped member to define a cavity between the first and second U-shaped members;
creating first and second apertures in a flange of both the first and second U-shaped members;
positioning a connection sleeve of a shock absorber with a coil spring assembly in the cavity aligned with one of the first and second apertures; and
inserting a fastener into one of the first and second apertures and the connection sleeve to connect the axle housing to the golf car at one of a first height and a second height.

23. The method of claim 22, further comprising:
coaxially aligning the first aperture in the flange of both the first and second U-shaped members; and
coaxially aligning the second aperture in the flange of both the first and second U-shaped members.

24. The method of claim 23, further comprising creating both the first and second U-shaped members each having first and second opposed legs both extending transversely from a flange.

25. The method of claim 24, further comprising attaching a nut on the flange proximate each of the first and second apertures of the first U-shaped member to threadably receive the fastener.

26. The method of claim 22, further comprising performing the connecting step by:
shaping a portion of the first U-shaped member to correspond to a shape of the axle housing; and
welding the first U-shaped member to the axle housing.

27. The method of claim 22, further comprising performing the fixing step by welding the second U-shaped member to the first U-shaped member.

28. The method of claim 22, further comprising positioning a biasing element about a shock absorber, the shock absorber having the connection sleeve, the biasing element and the shock absorber defining a travel limit of the suspension system.

* * * * *

UNITED STATES PATENT AND TRADEMARK OFFICE
CERTIFICATE OF CORRECTION

PATENT NO.        : 7,513,330 B2
APPLICATION NO.   : 11/419396
DATED             : April 7, 2009
INVENTOR(S)       : Christopher K. Furman et al.

It is certified that error appears in the above-identified patent and that said Letters Patent is hereby corrected as shown below:

Column 1, line 28 "permits" should be --permit--.

Column 1, line 52 "fastener into of one" should be --fastener into one--.

Column 1, line 54 "a" should be --an--.

Column 3, line 5 insert --be-- before "provided".

Column 6, line 24 "fastener into of one" should be --fastener into one--.

Column 8, line 4 "bracket and the a coil" should be --bracket and the coil--.

Column 8, line 17 "bracket including a first" should be --bracket including first--.

Signed and Sealed this

Thirtieth Day of June, 2009

JOHN DOLL
*Acting Director of the United States Patent and Trademark Office*